April 4, 1961 G. J. DE VOOYS ET AL 2,978,278
INSTALLATION FOR THE TRANSPORT OF LUMPY MATERIAL
Filed March 16, 1959 6 Sheets-Sheet 5
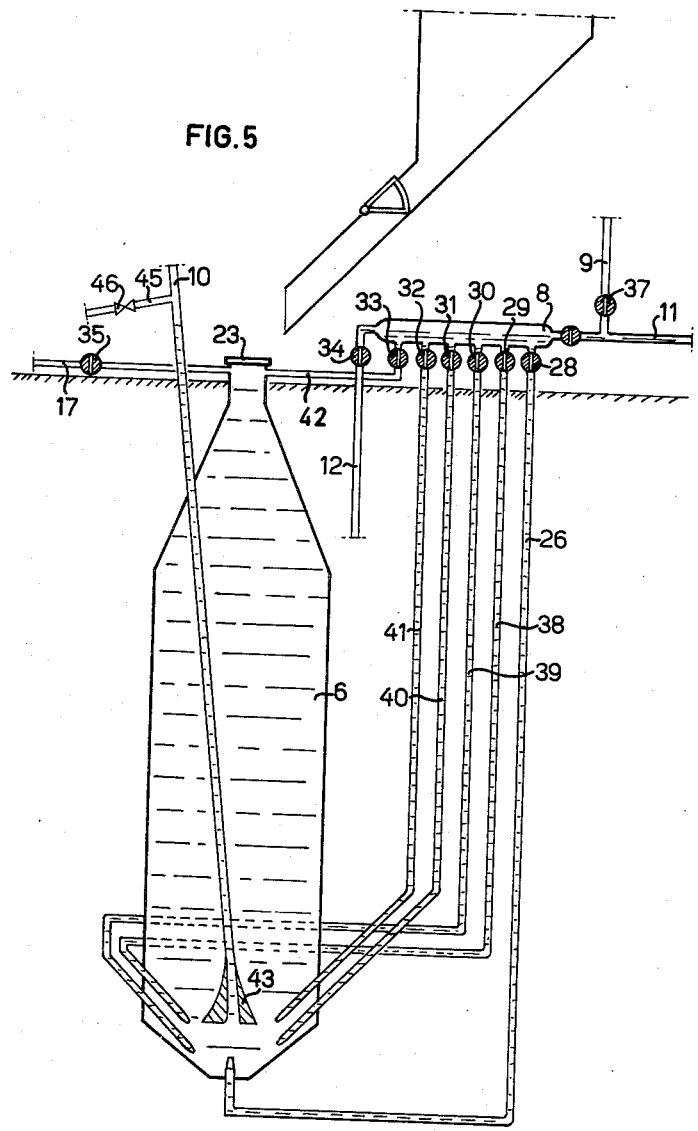
GERARD J. DE VOOYS AND
FREERK J. FONTEIN
BY: Cushman, Darby & Cushman
ATTORNEYS

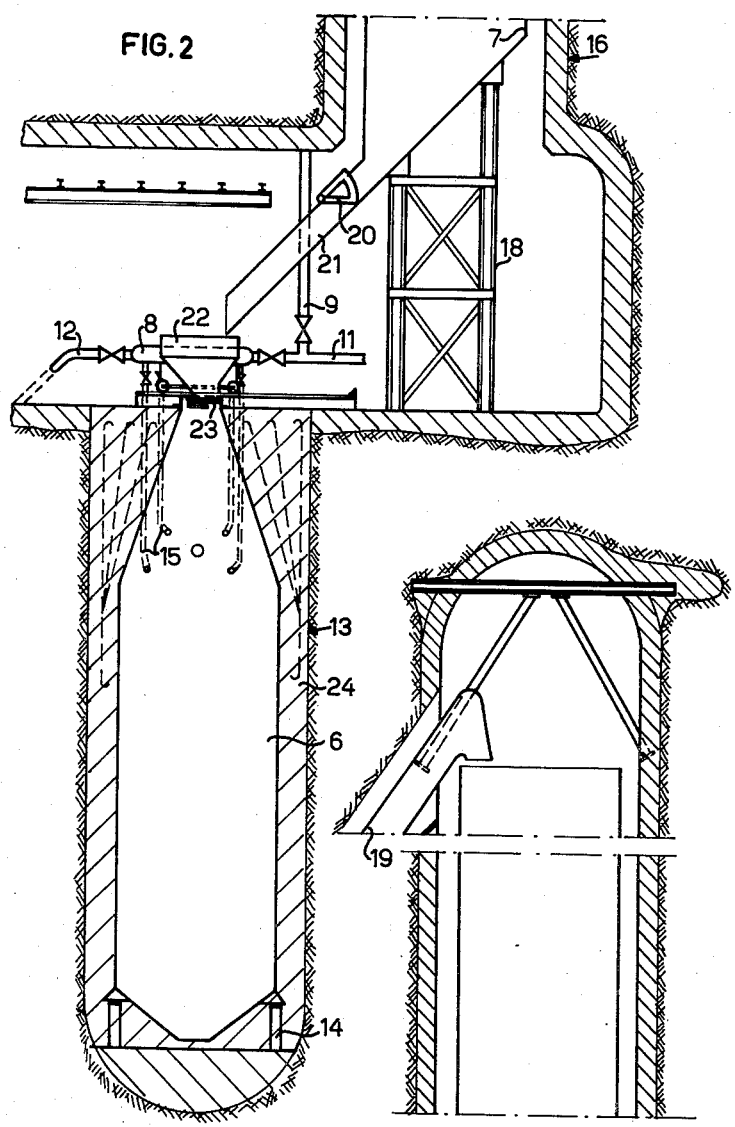

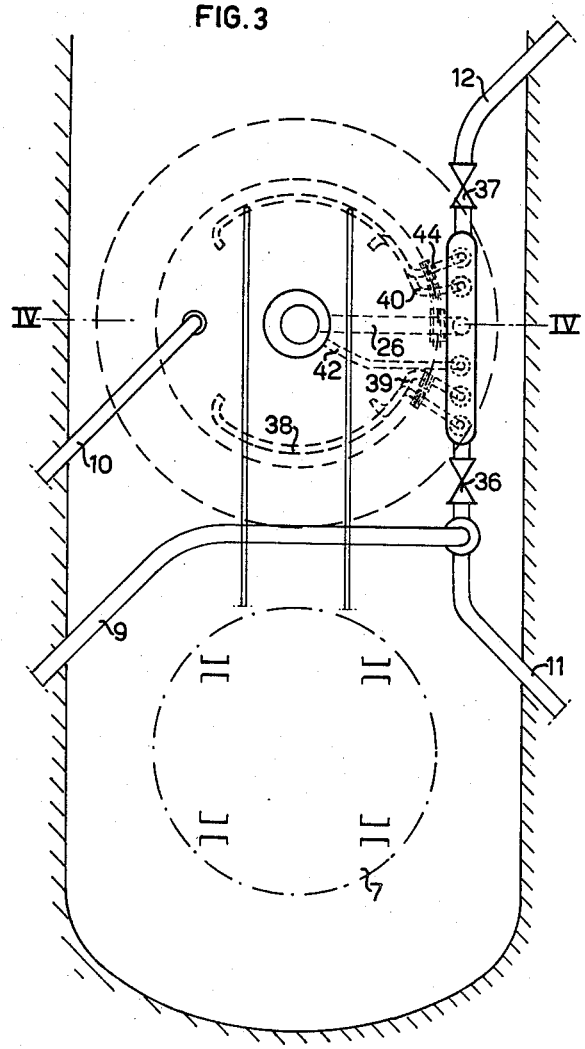

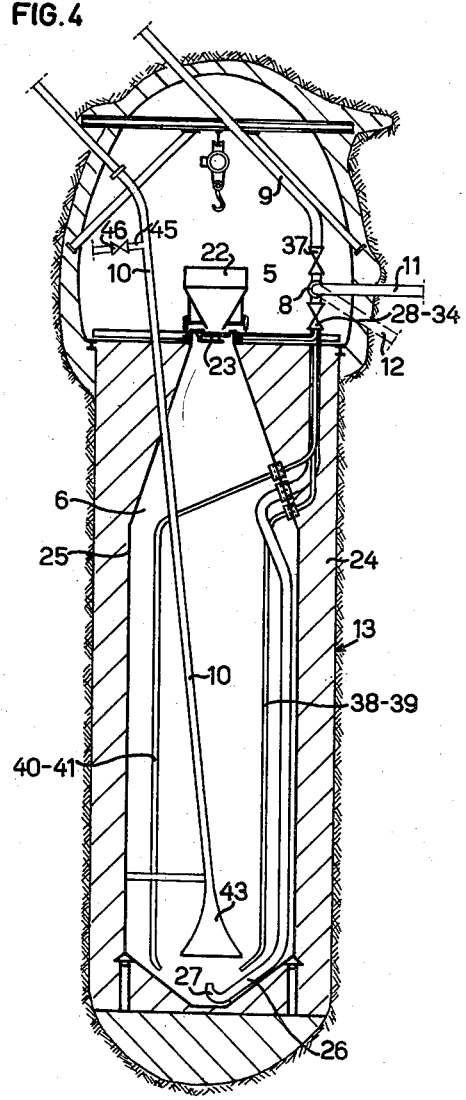

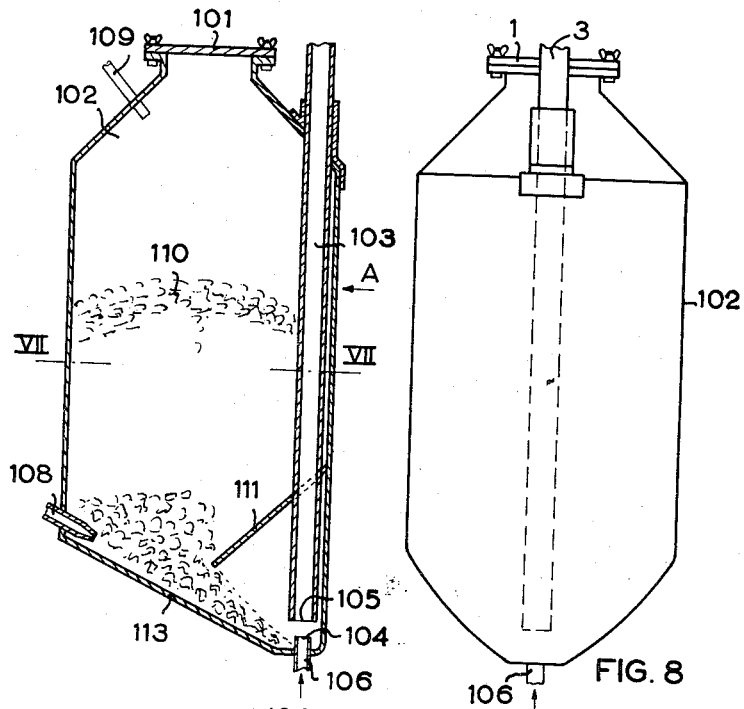
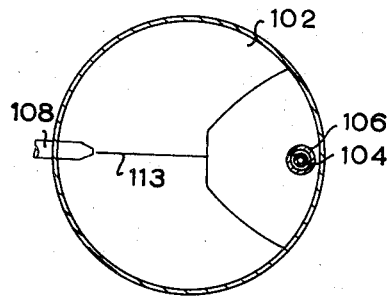

United States Patent Office 2,978,278
Patented Apr. 4, 1961

2,978,278
INSTALLATION FOR THE TRANSPORT OF LUMPY MATERIAL

Gerard J. de Vooys and Freerk J. Fontein, Heerlen, Netherlands, assignors to Stamicarbon N.V., Heerlen, Netherlands Filed Mar. 16, 1959, Ser. No. 799,492
Claims priority, application Netherlands Mar. 17, 1958
13 Claims. (Cl. 302—14)

The present invention relates to an installation for the transport of lumpy materials, such as ore or coal, for instance from the underground workings of a mine or the like, to a considerably higher level by means of a transport liquid, the installation consisting of a pressure vessel, means to feed material to this vessel at atmospheric pressure, means for the supply of transport liquid under the appropriate pressure, and a transport conduit connected to this vessel.

In this known installation a pressure vessel is used into which the material to be transported is discharged at atmospheric pressure, for instance from a bunker arranged above the installation, which bunker has a valve-controlled bottom outlet communicating with a chamber located under the pressure vessel, the said chamber being in open connection with a transport conduit through which a liquid, for instance mine water, is pumped to the surface. The pressure which prevails at the point where the material flows into the conduit is naturally dependent on the pressure head. Before the pressure vessel is filled a volume of water is pumped out of it which corresponds to the volume of material in the bunker; then the opening which connects the bunker with the pressure vessel is closed by means of a valve provided in the top of the pressure vessel, the pressure in the pressure vessel and the pressure in the transport conduit are equalized and the bottom valve of the pressure vessel is opened, as a result of which the material in the pressure vessel gravitates into the transport conduit in which it is entrained by the transport stream (British patent specification No. 730,326).

The dimensions of such an installation depend on the volume of material to be transported to the surface per unit time and on the depth at which the installation is located. The latter factor determines the pressure in the pressure vessel.

If the pressures are comparatively low it is still possible for the installation to have adequate dimensions while retaining a reasonable wall thickness, especially if the volume to be transported to the surface is not great. When this volume is increased the sectional areas of the pressure vessel and of the supply chamber under this vessel reach a limit beyond which the required wall thickness prohibits the realization of the construction. It will then be necessary to increase the number of installations or to make special arrangements to shorten the time needed for handling. If the number of installations were increased, very large and costly underground constructions would be required. The time needed for handling, i.e. the time needed for partly emptying the pressure vessel, filling this vessel with fresh material, closing the feed valve, bringing the pressure vessel to the required pressure, opening the bottom valve, draining the pressure vessel, and closing the bottom valve, depends in part on the time needed for the solid particles contained in the liquid in the pressure vessel to settle, so that it is not possible for solid particles to get between the feed valve and its seat during the closing of this valve. The above manipulations consequently require a certain time, although measures are taken to restrict this time as much as possible.

The greater the depth at which the installation is installed in the mine, the smaller the permissible diameter of the pressure vessel and consequently also the capacity of the installation.

The invention is based on the view that at very high pressures of, for instance, 60 atm. and higher, it is possible to install large-capacity pressure vessels, the walls of which by themselves are not capable of offering resistance to the pressures prevailing in these vessels, if the vessels are housed in the rock in such a way that the rock takes part of the stresses. This can be accomplished by providing a space in the rock in which the pressure vessel can be housed.

In this case, however, it is no longer possible to maintain the known construction, in which the pressure vessel communicates through a valve-controlled bottom with a chamber and with the transport conduit connected to that chamber, so that the material must be discharged in a different way.

According to the invention the vessel is so dimensioned that the vessel walls by themselves are not capable of absorbing the stresses caused by pressurization, and the vessel is placed in a pit-shaped space in the solid rock by conventional means and in a conventional way, so that the rock together with the material of the wall is capable of absorbing the stresses caused by pressurization, while the transport conduit runs through the vessel in a vertical or practically vertical direction and ends in a downwardly directed opening—serving to discharge the material and the transport liquid—at a short distance over the lowest point of the vessel.

According to the invention a layer of concrete may be provided between the rock and the wall of the vessel and a layer of reinforced concrete on top of the vessel; the vertical reinforcement bars in the latter layer are of such dimensions that together with the wall they are capable of absorbing the vertical tensile stresses occurring in the wall.

The arrangement according to the invention has the advantage that a large capacity pressure vessel can be installed which does not require a large operating space. The great capacity of the pressure vessel allows of filling it with a large quantity of material. It is now possible to allow far more time for filling the vessel, closing the cover, and operating the valves to control the supply of transport liquid to the pressure vessel.

It should be remarked that a pressure vessel provided with a riser which runs axially through the vessel and terminates over the bottom, and through which a liquid is discharged from the vessel under an overpressure prevailing in the part of the vessel over the liquid, is already known in other branches of industry.

In these known cases, however, such a conduit serves to discharge a liquid or a liquid containing suspended solid particles present in the vessel, and is not designed to discharge a liquid with lumpy material.

By properly controlling the feed pressure of the transport liquid and the quantities of liquid supplied through the various feed lines, the ratio between the quantities of solid particles and liquid on the one hand and the velocity of this mixture in the transport conduit on the other, can be rendered such that an optimum quantity of solid particles is transported to the surface per unit time. Also the concentration of solid particles in the liquid may be controlled by connecting the riser to a line through which liquid is fed under pressure and controlling the feed rate of this liquid.

It is also possible to have a telescopic transport conduit, means being provided to adjust the height of its inlet.

The installation according to the invention has the special advantage that no valve need be provided in the transport conduit. For, it has been found that the weak point in any hydraulic transport system is the valves, which are a continuous source of trouble due to wear and leakage.

Another advantage is that in many cases the transport liquid line descending in the shaft can be left out.

Substantially all of the material to be transported is discharged from the pressure vessel and the transport conduit, with simultaneous supply of transport liquid to the pressure vessel, before substantially all of the liquid in the transport conduit is discharged through the pressure vessel while the pressure in the pressure vessel is being relieved.

The protective rights also cover a method of discharging such material and the construction developed for this purpose. According to the invention an axial liquid current is generated under the feed opening of the riser in the direction towards this riser. The supply of material to this liquid current may be backed and controlled by radial liquid currents produced in the bottom part of the vessel in the material.

According to the invention the above-mentioned liquid currents originate in at least one conduit through which liquid is fed in under pressure, and which ends in the vicinity of the inlet of the transport conduit. By preference one feed line should be provided with an upwardly directed nozzle arranged concentrical and coaxial with the end of the transport conduit and at some distance therefrom. By preference the diameter of the nozzle should be smaller than that of the transport conduit.

In order to avoid accumulation of material over the nozzle the bottom section of the transport conduit is provided with a projecting rim or the like, so dimensioned that the material in the pressure vessel forms such a heap that the said rim, or the like, and the said heap, enclose a free space, which extends to or nearly to the bottom of the vessel, vertically under the feed opening.

As a result of the cross-sectional area of the nozzle being smaller than that of the transport conduit the velocity in the transport conduit will be smaller than that of the liquid issuing from the nozzle, and the energy released will give rise to turbulent currents which pass along the slope of the material and entrain particles of it to the transport conduit.

According to the invention the installation may also incorporate a number of feed lines for transport liquid which open into the base of the pressure vessel, and whose nozzles are directed radially and end at such a distance from the slope formed by the material that there is always a thin layer of material in front of the nozzle. In that case it is even possible for the installation to be operated without the conduit debouching under the inlet of the transport conduit. Moreover, the installation according to the invention may incorporate a feed line for transport liquid opening into the top of the pressure vessel.

The invention also includes a process for the hydraulic transport of solid particles under high pressure by means of a pressure vessel, in which process part of the liquid present in the pressure vessel is removed atmospheric pressure, to be subsequently replaced by the material to be transported, and discharged under pressure through the transport conduit. According to the invention this discharging attended with the supply of transport liquid to the pressure vessel is continued until substantially all of the material to be transported has been discharged from the pressure vessel and the transport conduit, after which substantially all of the liquid in the transport conduit is discharged through the pressure vessel while the pressure in the pressure vessel is being relieved.

The process according to the invention has the advantage that no solid particles pass through the control valves of the installation.

Owing to the presence of great lumps, and a non-uniform gravitation of the material to the lowest point of the bottom, if this point lies in the axis of the pressure vessel, or to irregularities in the supply of liquid through lines other than the central injection line, a change may occur in the direction of the liquid jet to the feed opening of the transport conduit. This results in a less satisfactory injection, and consequently in the material being discharged less satisfactorily.

This drawback may be removed by using a different construction of pressure vessel. To this end the shape of construction of the bottom should be such that the lowest point of the bottom is in the vicinity of the vertical circumferential wall, and the feed opening of the transport conduit is over this point.

The simplest construction is that in which the bottom is constituted by a flat plate which makes an angle with the vertical axis of the pressure vessel.

By preference the bottom should be constructed like a V-shaped trough, constituted by sloping walls which intersect along a line through the axis of symmetry and the lowest point of the pressure vessel, while in a place of the bottom where these walls intersect, there debouches a conduit, through which liquid is supplied under pressure along the line of intersection of these walls and towards the lowest point of the bottom.

It should be remarked that the said walls may be flat or slightly curved. Also, it may be of advantage if at the point of junction they are joined by a curved plane. By preference the transport conduit should be connected to means for preventing an upward liquid current along the transport conduit.

These means may consist of, for instance, a sloping plate fitted around the transport conduit and connected to the wall of the pressure vessel in the vicinity of the transport conduit, the lower edge of this plate ending at some distance from the bottom of the pressure vessel.

This plate is so disposed that the natural slope formed by the material fed into the pressure vessel is such that the injection effect of the liquid jet is not adversely affected by the material.

The invention is illustrated in the accompanying drawing, which shows an example.

In this drawing:

Fig. 2 is a diagram of a vertical section of the installation according to the invention;

Fig. 3 is a top view of the pressure vessel;

Fig. 4 is a sectional view along the line IV—IV in Figure 3;

Fig. 5 is a diagram of the pipe system illustrating the working of the installation;

Fig. 6 is a vertical section of a modified embodiment of the pressure vessel;

Fig. 7 is a sectional view along the line IV—IV in Figure 6;

Fig. 8 is a side view of the variant embodiment, along arrow A in Figure 6.

Figure 1:
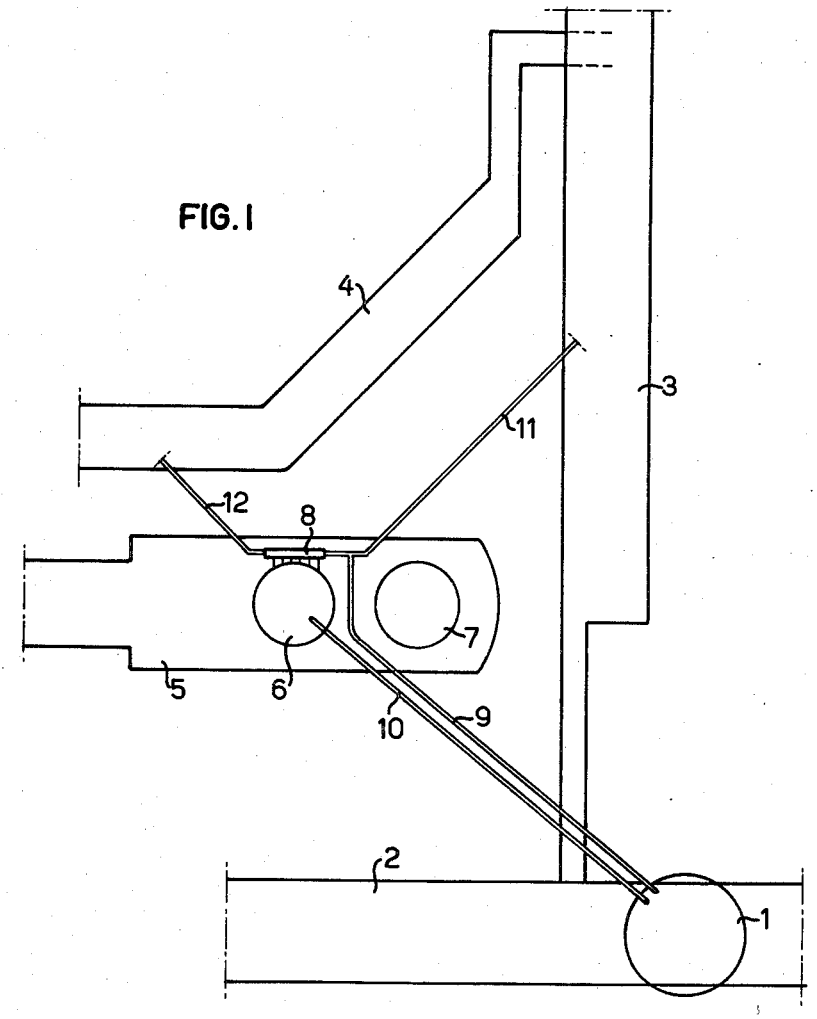
Fig. 1 is a diagram of the arrangement of the installation according to the invention.

In Figure 1 the numeral 1 refers to a shaft and 2 to a main haulage road with which a pump room 3 is connected. Numeral 4 refers to a water gate which serves as a buffer space for mine water. In the vicinity of the shaft, the pump room 3, and the water gate there is a working room 5 in the floor of which the pressure vessel 6 is mounted in the rock, and into the roof of which debouches a vertical-walled space containing the bunker 7. Numeral 8 refers to a manifold with the various valves which serve to operate the lines through which transport liquid is supplied or discharged. This manifold 8 is connected with the delivery lines 11, 9 from the pumps and with the line 12 to the water gate. Numeral 10 refers to the transport conduit running through the shaft 1 from the pressure vessel 6 to the surface.

Figure 2 shows a vertical section of the pressure vessel without the transport conduit, the supply lines, and the bunker space. In the floor of the working room 5 a shaft 13 has been sunk in the rock. In this shaft the pressure vessel 6 is mounted on a support 14. Between the pressure vessel 6 and the shaft 13 there is a concrete filling 24 of sufficient thickness to absorb any settling of the rock. This concrete filling has a thickness of, for instance, 50 cm. or more. It is also possible to cramp the shaft wall in the usual way, in which case a thinner layer of concrete may be used. If necessary, the concrete filling may be provided with an annular reinforcement, whether or not prestressed. If the shaft 13 containing the pressure vessel is located in the vicinity of the mine shaft 1, i.e. in the safety pillar, there is no danger of rock settling. The concrete filling transfers the stresses in the vessel to the rock, so that the wall of the pressure vessel need not be so thick as would be necessary if it were to take the horizontal stresses by itself. In order that the pressure vessel may absorb part of the vertical tensile stresses occurring in the wall, the vessel is provided with a layer of concrete containing a vertical reinforcement 15, the collective sectional area and the length of the tie rods of which are calculated to absorb the vertical forces occurring in the vessel. By preference the top section of the pressure vessel should be conical. It may be advisable to have the vertical reinforcement extending down to the bottom of the concrete filling and to prestress the concrete. Into the roof of the working room 5 opens a concrete-lined space 16 hewn out in the rock, which space contains a bunker 7 for the material to be transported, which rests on a framework 18. This bunker is fed by a bucket elevator 19 and is provided with a valve-controlled feed chute 21. Through a travelling hopper 22 the material can be discharged into the pressure vessel 6, which can be closed by means of an appropriate valve 23.

Figure 3 represents a top view of the pressure vessel 6, the situation of the bunker 7 being indicated by a dash-dot line. This figure shows the arrangement of the supply lines to the pressure vessel and of the line through which the material is discharged.

Figure 4 shows on an enlarged scale a section along the line IV—IV in Figure 3. As indicated by the figure, the pressure vessel 6 contains a transport conduit 10, which is arranged substantially axially in the pressure vessel and ends at a short distance over the bottom. Along the wall 6 runs a line 26 through which transport liquid is supplied, and which, at 27, debouches axially under the opening of the transport conduit 10; the upper end of this line is connected to the manifold 8 through valve 28 (cf. Figure 5). By preference the sectional area of the mouth 27 should be smaller than that of the conduit 10. The numerals 28–37 refer to the various control valves, 38–41 refer to the transport liquid supply lines. These lines debouch at a short distance from the bottom of the pressure vessel and are provided with radially directed mouths. A line 42, controlled by a valve 33, debouches into the top of the pressure vessel 6. A compressed air feed line 17, provided with a valve 35, also debouches into the top of the pressure vessel 6. The bottom section of the line 10 is conical, so that the material present in the vessel 6 forms a slope around the mouth 27, as a result of which this is not at all or only thinly covered with the material. The cone 43 may be hollow or, as shown in the drawing, solid, with a passage for the line 10.

By preference the line 10 should not be provided with a valve.

A conduit 45 provided with a valve 46, may also be connected to the manifold 8 and debouches into the conduit 10.

The operation is elucidated by means of Figure 5.

When the installation is put into operation for the first time, all supply lines to the pressure vessel are closed. Then the vessel is partly filled with liquid through one or more supply lines. After that the supply lines are closed again and the material to be transported is discharged into the vessel 6 until this is completely full. The cover 23 is closed and the transport liquid is admitted through the lines 26 and 42 until the conduit 10 is entirely filled with liquid. The pressure is now increased until a current of such strength has been established in conduit 10 that this entrains the solid particles present in the conduit. The concentration of the mixture of liquid and solid particles in the transport conduit 10 is controlled by adjustment of the feed through the lines 26, 38–42. The lines 38–41 serve to assist the supply of solid particles to the inlet of the conduit 10. The object of supplying liquid through the line 42 is to counteract false currents in the pressure vessel. Since the outlet opening of the mouth 27 is smaller than that of the conduit 10, the velocity of the liquid issuing from this mouth will be greater than the velocity in the conduit 10. The energy which is thus released will give rise to turbulence along the slope of the solid material, so that particles will be entrained and get into the liquid current towards conduit 10. The supply of transport liquid is kept up until no more solid particles issue from the upper end of conduit 10. The concentration of the solid particles in the liquid in the conduit 10 can also be controlled by adjustment of the valve 46. The valve 36 is then closed and the valves 34 and 37 are opened, so that the liquid in conduit 10 can flow back and be discharged into the water gate. For this purpose a separate discharge line may be used which opens into the vessel at a higher level, so that lumps of material that may have been left in the vessel are prevented from blocking up the nozzles or passing through the valves.

Then valve 35 is opened and by means of compressed air as much liquid is discharged from the pressure vessel to the water gate as makes it possible to introduce the next charge of material. After the valves 35 and 28–34 have been closed the air in the top of the pressure vessel can be vented and the cover opened, after which the next cycle of operations can be started.

The energy which is lost through the repeated draining of conduit 10 is only a fraction of the total energy consumption and is tolerated in view of the advantage that no material flows through any of the valves.

It stands to reason that the manipulations of the valves may deviate from the foregoing description without their being beyond the scope of the invention. For instance, the water flowing back from the conduit 10 may be discharged exclusively through the line 42.

In the type of construction according to the Figures 6–8 the transport conduit 103 is mounted close to the wall 102 and the bottom of the vessel has such a shape that the lowest point of the bottom is at a short distance from the feed opening 105 of the transport conduit 103. The bottom may be a substantially flat, sloping plate, but should preferably consist of a V-shaped trough, the side walls of which intersect along the sloping line 113. Instead of intersecting along the mathematical line 113, the sides of the trough-shaped bottom may be joined by a curved plane. The nozzle 104 terminating the conduit 106, through which liquid is fed in under pressure, is coaxial with the conduit 103, under the feed opening 105. Moreover, a conduit 108 through which liquid is fed in under pressure, debouches over the trough-shaped bottom, in such a way that the liquid entrains the solid material to the lowest point of the pressure vessel. Around the transport conduit 103 there is fitted a sloping plate 111, the upper edge of which is in contact with the wall of the pressure vessel and the lower edge of which ends at a short distance from the bottom. This plate is provided in order that the material 110 in the pressure vessel may form such a slope that it cannot accumulate between the nozzle 104 and the opening 105. Another object of the plate 111 is to counteract the occurrence of upward currents along the conduit 3.

Into the top of the vessel, which can be closed by a cover 101, there debouches a conduit 109 through which liquid is fed in under pressure. Also into the top of the vessel there may debouch a compressed-air feed line (not shown in the drawing). The pressure vessel according to Figures 6–8 is used in the same way as the vessel according to Figures 2–5. However, since the feed opening 105 is disposed over the lowest point of the bottom, which point is in the vicinity of the wall of the vessel, there will be a much smaller chance of the formation of horizontal turbulent currents, than in the case of the pressure vessel according to the Figures 2–5.

*Example*

The pressure vessel is located at about 440 m. below the surface and is 16 m. in height, measures 4 m. across and has a volume of about 150 m.$^3$. Its maximum working pressure is 70 atm. gauge. The concrete filling is 75 cm. thick. The wall thickness of the pressure vessel is 70 mm. At 70 atm. gauge working pressure the horizontal tensile stress in the material is 4000 kg./sq. cm. and the vertical tensile stress 1980 kg./sq. cm. The stresses that cannot be absorbed by the wall are transferred to the rock by the concrete. In the same way the vertical stresses are absorbed by the reinforcement in the concrete.

At a flow rate of the mixture of liquid and material in the transport conduit of 1.7 m./sec. the material is raised at the rate of 192, 300 and 340 cu. m./h. when the diameters of the transport conduits are 200, 250 and 300 mm. respectively; this corresponds to a daily output of about 500, 800 and 1100 m.$^3$, respectively, taking into account that out of every 24 hours the installation is operated for 16 hours, 8 hours of which are used for pressing material up to the surface and 8 hours for charging and the manipulations needed for this purpose.

We claim:

1. Apparatus for the hydraulic transport of lumpy solid material, from the underground workings of a mine to a considerably higher level comprising, in combination, a pressure-vessel, an aperture at the top of said vessel for feeding the solids at substantially atmospheric pressure to the vessel, means for closing said aperture so as to substantially be pressure and liquid tight, a transport conduit for the transportation of a mixture of liquid and solid lumpy material from the vessel to said higher level, said conduit running substantially vertically through the vessel and having a downwardly directed inlet opening at a short distance over the lowest point of the vessel, means for supplying a fluid underpressure of at least 25 atmospheres into said vessel, said vessel and its walls being so dimensioned that the walls by themselves are not capable of resisting the tensile stresses occurring in the wall caused by the said pressure fluid in the said vessel, said vessel being adapted for disposition in a pit-shaped space in the solid rock formation of the mine that the rock is capable to support the wall of the vessel in resisting the said tensile stresses.

2. Apparatus according to claim 1 wherein a lining of reinforced concrete is provided between the rock and the wall of the vessel so as to evenly distribute the forces exercised on the said wall to the rock, and also upon the upper part of the vessel enclosing the feed aperture, at least the upper part of the concrete lining being provided with vertical bars having such thicknesses and lengths that together with the wall of the vessel they are capable of resisting the vertical tensile stresses occurring in the wall.

3. Apparatus according to claim 2, wherein at least part of the vertical reinforcement bars are prestressed.

4. Apparatus according to claim 1, wherein the fluid supply means comprises at least one feed conduit debouches substantially at the bottom of the pressure vessel, the nozzle of each conduit being so directed as to cause a liquid flow directly to the inlet aperture of the transport conduit substantially concentric and coaxial with respect to the lower part of said transport conduit.

5. Apparatus according to claim 4, wherein the inlet aperture of the transport conduit is located substantially over the lowest part of the bottom of the pressure vessel.

6. Apparatus according to claim 5, wherein the bottom of the pressure vessel is formed as an inverted cone, the top of the cone being located in the axis of the pressure vessel.

7. Apparatus according to claim 5, wherein the lowest part of the bottom is located close to the side wall of the pressure vessel.

8. Apparatus according to claim 4, wherein the lower part of the transport conduit is provided with projecting means having such dimensions that material discharged into the pressure vessel will form a sloping surface, said surface confining a space substantially in the shape of an inverted cone, the base of said cone being formed by said projecting means and the top of said cone being located at or near the bottom of the vessel.

9. Apparatus according to claim 8, wherein a feed pipe for liquid under pressure is provided with a nozzle located in the top of said conical space, the nozzle being directed towards the aperture of the transport conduit.

10. Apparatus according to claim 7, wherein the bottom of the pressure vessel is constructed substantially like a V-shaped trough, constituted by sloping side walls intersecting along a line through the longitudinal axis of the pressure vessel and the lowest point of the bottom.

11. Apparatus according to claim 10, wherein a conduit for liquid under pressure debouches in the said V-shaped trough, the nozzle of said conduit being so directed as to allow a jet of liquid being directed along the line of intersection of the side walls of the trough in the direction to the lowest point of the bottom.

12. Apparatus according to claim 7, wherein a feed pipe for liquid under pressure is provided with a nozzle located axially below the inlet aperture of the transport conduit, said nozzle being directed towards said aperture.

13. Apparatus according to claim 7, wherein plate means are connected to the lower part of the transport conduit and the adjacent wall parts of the pressure vessel so as to prevent an upward liquid current beyond said plate means, said plate means sloping downwards from the place of connection, the lower edge of said plate means being located at a distance from the bottom of the vessel so as to allow solid material discharged into the vessel forming a slope extending into the space below said plate means, so that the foot of said slope does not extend beyond the axis of the lower part of the transport conduit.

References Cited in the file of this patent

UNITED STATES PATENTS

| | | |
|---|---|---|
| 674,021 | See | May 14, 1901 |
| 1,563,200 | Leicknam | Nov. 24, 1925 |
| 2,382,171 | Pomykala | Aug. 14, 1945 |
| 2,643,161 | Shirk | June 23, 1953 |
| 2,793,082 | Gardner | May 21, 1957 |
| 2,938,751 | Nogami | May 31, 1960 |

FOREIGN PATENTS

| | | |
|---|---|---|
| 402,236 | Germany | Sept. 13, 1924 |
| 587,335 | Great Britain | Apr. 22, 1947 |